(12) United States Patent
Brown (10) Patent No.: US 10,656,982 B2
(45) Date of Patent: May 19, 2020

(54) APPARATUS AND METHOD FOR COMMUNICATING DATA IN A MULTI-TENANT COMPUTER SYSTEM

(71) Applicant: Sage People Limited, Tyne and Wear (GB)

(72) Inventor: Alastair Brown, Reading (GB)

(73) Assignee: Sage People Limited, Newcastle upon Tyne (GB)

( * ) Notice: Subject to any disclaimer, the term of this patent is extended or adjusted under 35 U.S.C. 154(b) by 0 days.

(21) Appl. No.: 16/399,286

(22) Filed: Apr. 30, 2019

(65) Prior Publication Data
US 2019/0332452 A1 Oct. 31, 2019

(30) Foreign Application Priority Data

Apr. 30, 2018 (GB) .................................. 1807039.1

(51) Int. Cl.
*G06F 9/54* (2006.01)
*G06F 13/42* (2006.01)
(52) U.S. Cl.
CPC .............. *G06F 9/548* (2013.01); *G06F 13/42* (2013.01); *G06F 2213/40* (2013.01)
(58) Field of Classification Search
CPC ...................................................... G06F 9/548
See application file for complete search history.

(56) References Cited

U.S. PATENT DOCUMENTS 6,779,184 B1 * 8/2004 Puri ........................ G06F 9/542
709/238
8,626,716 B1 1/2014 Katzer et al.
(Continued)

FOREIGN PATENT DOCUMENTS

WO WO 98/02814 A1 1/1998

OTHER PUBLICATIONS

GB1807039.1, Nov. 21, 2018, Combined Search and Examination Report.
(Continued)

*Primary Examiner* — Farley Abad
(74) *Attorney, Agent, or Firm* — Wolf, Greenfield & Sacks, P.C.

(57) ABSTRACT

An aspect of the present invention provides a computer system, comprising one or more processors and one or more computer-readable data storage mediums, program instructions, stored on at least one of the one or more storage mediums for execution by the one or more processors, to provide a multi-tenant cloud computing environment to support at least first and second applications executing on the one or more processors within the cloud computing environment, an object bus for communicating object bus objects between applications supported by the cloud computing environment, and an object broker arranged to request, from an object provider associated with the first application, data from the first application, and an object mapper associated with the first application arranged to translate an object comprising the requested data to the object bus object, wherein the object provider provides the object bus object comprising the request data to the object broker to communicate the object bus object to the second application.

19 Claims, 7 Drawing Sheets

(56) References Cited

U.S. PATENT DOCUMENTS

| | | | | |
|---|---|---|---|---|
| 2002/0038340 A1* | 3/2002 | Whipple | ................ | G06F 9/465 |
| | | | | 709/203 |
| 2003/0061398 A1* | 3/2003 | Wilson | ................... | G06F 9/465 |
| | | | | 719/318 |
| 2006/0080394 A1* | 4/2006 | Goodman | ............ | H04L 63/101 |
| | | | | 709/206 |
| 2014/0075455 A1 | 3/2014 | Annapragada | | |
| 2014/0280961 A1* | 9/2014 | Martinez | ............ | H04L 41/5054 |
| | | | | 709/226 |

OTHER PUBLICATIONS

Combined Search and Examination Report for United Kingdom Application No. GB1807039.1 dated Nov. 21, 2018.
Combined Search and Examination Report for United Kingdom Application No. GB1906029.2 dated Feb. 25, 2020.

* cited by examiner

APPARATUS AND METHOD FOR COMMUNICATING DATA IN A MULTI-TENANT COMPUTER SYSTEM

RELATED APPLICATION

The present application claims the benefit under 35 U.S.C. § 119 of United Kingdom Patent Application No. 1807039.1, filed Apr. 30, 2018, the entire contents of which are incorporated herein by reference.

BACKGROUND

Cloud computing is increasingly ubiquitous. Cloud computing involves remote computing resources supporting applications which are accessed by remote users. Cloud computing separates the provision of software and management of computing resources, particularly hardware, necessary to support that software.

Cloud computing may use multi-tenancy where many tenants share common computing resources. The computing resources may be shared amongst tenants, e.g. business, organisations and people, and multiple applications. A key requirement of multi-tenancy is that data belonging to each tenant must remain private to that tenant despite the sharing of resources. The requirement of privacy must be respected by the cloud computing environment and applications executing within that environment. It is often desired for multiple applications to share a tenant's data. In some instances, it may not be possible for the applications to communicate directly unless they are compatible, such as originating from a single application vendor. For example, one application may be a Human Resources (HR) application which contains data relating to employees of a business as one or more objects. Another application may be a payroll application which requires information about the employees to administer a payroll function, such as an employee's salary data which is owned by the HR application. In a multi-tenant computing environment allowing one application to access data of another application may create a dependency between the applications. The application accessing the data may become dependent on the application providing the data. Such dependency may limit a freedom to update one or both of the applications.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
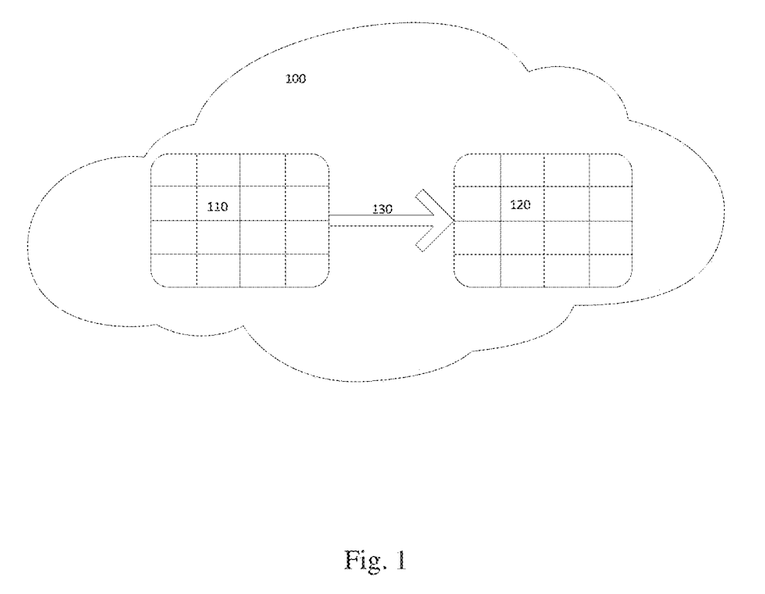
FIG. 1 shows a multi-tenant computing environment according to an embodiment of the invention.

FIG. 1 illustrates a multi-tenant cloud computing environment (MTCCE) 100 according to an embodiment of the invention. The MTCCE 100 includes computing resources to support a plurality of applications including a first application 110 and a second application 120. Although not illustrated in FIG. 1 the computing resources comprise one or more processors and memory sufficient to store data for the MTCCE 100 and the first and second applications 110, 120. The first and second applications 110, 120 are illustrated in FIG. 1 with hatching showing that each of the applications 110, 120 has multiple tenants in the MTCCE 100. It is desired for the second application 120 to be provided with data from the first application 110. In this sense it is desired for the first application 110 to be a data object source for the second application 120. However, it is desired to avoid a dependency of the second application 120 on the first application 110. In other words, it is desired for the applications 110, 120 to remain independent.

A client computer is arranged to communicate with the MTCCE 100. The client computer communicates with the MTCCE 100 via one or more computer networks, which may include the Internet. The client computer utilises the second application executing in the MTCCE 100. The client computer, in use, receives data from the second application as will be explained. The client computer, or another client computer, may be arranged to communicate with the MTCCE 100 via the one or more computer networks. The client computer utilises the first application executing in the MTCCE 100.

Figure 2:
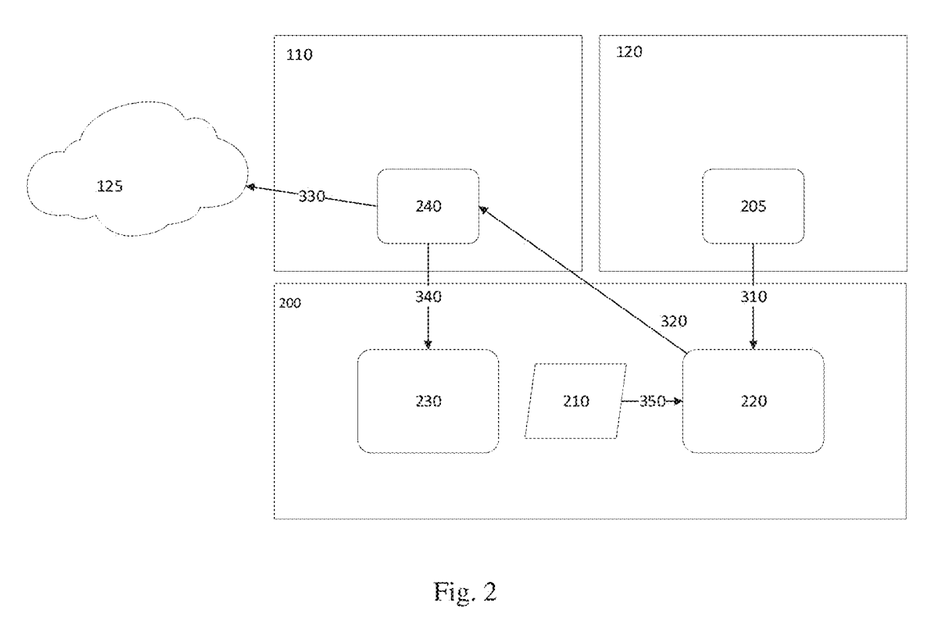
FIG. 2 shows a multi-tenant computing environment comprising an object bus operable in a synchronous mode according to an embodiment of the invention.

FIG. 2 illustrates the MTCCE 100 supporting the first and second applications 110, 120. The MTCCE 100 further comprises an object bus 200 which communicates object bus objects 210 between applications supported by the MTCCE 100. In the illustrated example the MTCCE 100 will be illustrated as supporting data communication between the first application 110 and the second application 120.

The object bus object 210 is a canonical data object for communicating data between the first application 110 and the second application 120 without dependency between the applications 110, 120. The object bus object 210 is an object forming part of an object graph i.e. which may have a parent object and one or more child objects, thus having a hierarchy. The object bus 200 allows single, i.e. individual, objects to be communicated or object graphs to be communicated between the applications. In this way, a meaningful portion of an overall object graph may be communicated in response to a request by one of the applications. An object has a lifecycle including creation, updating and deletion. The object bus object 210 may store data in the form of one or more attributes.

The object bus 200 is operable to communicate events providing information about events occurring within the MTCCE 100. The events may be communicated between applications supported by the MTCCE 100 such as the first and second applications 110, 120. The events may also be communicated with respect to components of the object bus 200 as will explained. Events may be communicated to registered object subscribers as will be explained. The MTCCE 100 comprises an object broker 220 and an object mapper 230. The object mapper 230 may only be instantiated at a time of use and, thus, may not always exist.

The object bus 200 is selectively operable in a synchronous mode or an asynchronous mode. In the synchronous mode data is communicated by the object bus 200 in a single operation or transaction, whereas in the asynchronous mode the data is communicated over more than one operation or transaction. Advantageously, the ability to support asynchronous communication of object bus objects allows greater flexibility particularly in the multi-tenant environment. In a multi-tenant environment, restrictions on use of the computing resources supporting the environment often exist, often to prevent tenants consuming excessive resources. The use of asynchronous communication of data takes place in a plurality of transactions within the MTCCE 100. Having a receipt of data being handled in a separate transaction allows the recipient application to process the received data using computing resources available in a transaction without at least some of those resources having been already consumed sending the data. For example, splitting the transmission and receipt of data into separate transactions may assist with one or both of the amount of data able to be communicated between the applications 110, 120 and an amount of processing time available to process that data. The mode of operation of the object bus 200 may be selected by one of the applications using the object bus 200, i.e. one of the first and second applications 110, 120 as will be explained.

Figure 3:
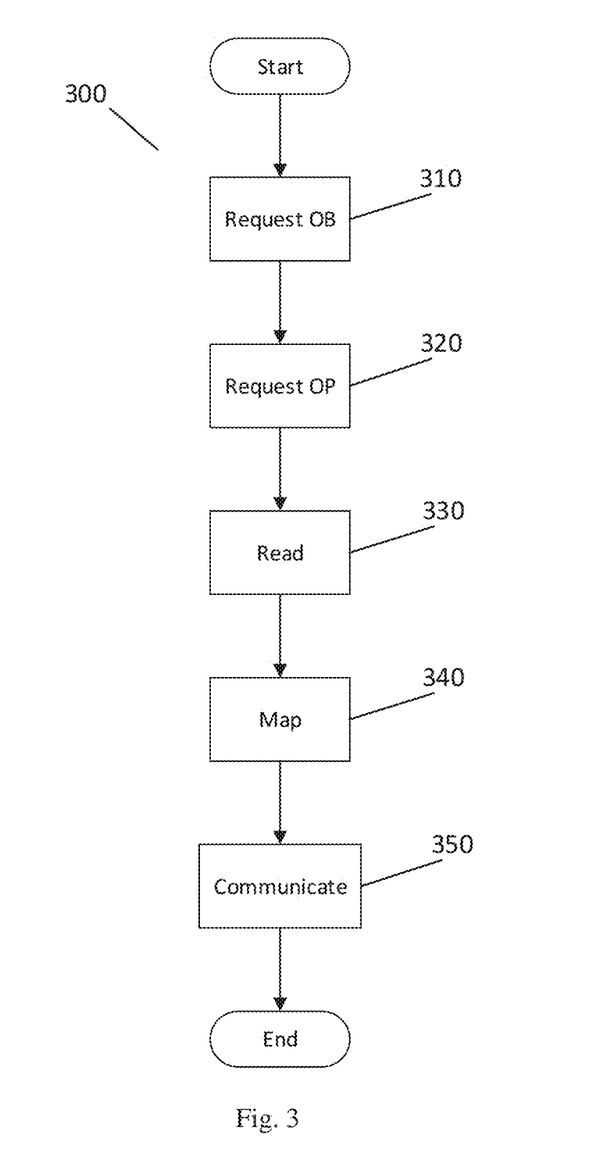
FIG. 3 shows a method according to an embodiment of the invention.

The object bus 200 will now be described operating in a synchronous mode with reference to a method 300 shown in FIG. 3. Method steps are also illustrated in FIG. 2 between entities for clarity. FIG. 3 may be considered to represent a pull mode of operation as an object consumer wishes to obtain data from an object source. In this case the object consumer is the second application 120 whilst the object source is the first application 110.

As illustrated in FIG. 3, the method 300 comprises a step 310 of requesting data from the object broker 220. The request for data originates from the second application 120 as the object consumer in the synchronous pull mode. The request may be made by the second application 120 calling an object bus function.

The second application 120 comprises an object subscriber 205. The object subscriber 205 is an entity associated with the second application 120 which is registered with the object bus 200. The object subscriber 205 is arranged to register with the object bus 200. The object subscriber 205 is authorised by an object provider to read data owned by the object source i.e. the first application 101. Thus, as part of registration, the object subscriber 205 is authorised by the first application 101. As will be described below, the object subscriber 205 may also subscribe to receive events indicative of changes in the data, as will be explained. In some embodiments, the object subscriber 205 may communicate a notification to the object source application.

The request is received at the object broker 220 as shown in FIG. 2. The request may be generated at the second application 120 in response to logic within the second application 120 determining that the data is required. The request may identify the object source i.e. the first application 110. The request may be issued by the object subscriber 205 of the second application. The request may specify data requested from the first application 110 by the second application 120.

In dependence on receiving the request the object broker 220 may create an object provider 240 associated with the object source.

The method 300 comprises a step 320 of requesting the data from the object provider 240. The object provider is an interface which may be defined by the object bus 200. The object provider 240 is implemented by the object source i.e. the first application 110 as an interface. The object provider 240 is able to operatively read 330 data 125 owned by the first application 110 stored within the MTCCE 110 as in step 330. The data may be read by obtaining an object comprising the data which is owned by the first application 110. The data may be read by using Salesforce Object Query Language (SOQL) in some embodiments. The object provider 240 may be registered for a defined object type associated with the object source such as a named object type associated with the first application 110. A reference implementation of the object provider may read objects from database of the MTCCE 110 using SOQL. When the first application 110 uses the reference implantation of the object provider, a source object type name is the same as a name of a table in the database. However other, bespoke, implementations of the object provider may be used where the object type name may differ.

The object broker 220 creates an object mapper 230. It will be noted that the object mapper 230 is not necessarily created at step 340 i.e. the object mapper 230 may be created in advance. The object mapper 230 is responsible for mapping data from the object owned by the first application to the object bus object 210. The object mapper 230 utilises mapping information provided by the object source i.e. the first application 110 to map data from the object owned by the first application 110 to the object bus object 210 i.e. the object mapper translates the first application's data object to the object bus object 210. The mapping information may be provided as one or more mapping rules which detail translation of the data provided by the object source to the object bus object. The mapping information in some embodiments relates to a named object type associated with the source package. The mapping information may define a mapping of one or more fields of the source object to one or more fields of the object bus object. The mapping information may be provided following creation of the object mapper 230. Thus the mapping information may be provided to the object mapper in dependence on the request from the object subscriber 205. Advantageously provision of the mapping information allows the object bus object to be modified dynamically, in contrast to using predetermined rules. Thus, in step 340, the first application's data object is mapped to the data bus object 210 which is independent of the first application 110.

In step 350 the object broker 220 communicates data from the object bus object 210 to the second application 120 to fulfil the request. In some embodiments the data may be returned to the second application 120 as one or more return values of the object bus function called by the second application in step 310. The object subscriber 205 receiving the data bus object 210 may provide data within the object bus object 210 to fulfil the need for the data determined by the logic within the second application 120 that determined the data was required.

In the above, the method 300 is performed within a single operation or transaction. That is, the request is received 310 from the second application 120 and the object bus object 210 provided in response during the single transaction. However, it may not be possible to achieve communication of large amounts of data to the second application 120 during the single transaction. Therefore, some embodiments of the object bus 200 support selective operation in an asynchronous mode, as will be described with reference to FIGS. 4 and 5. The object subscriber 205 may indicated the selected mode as part of the request in step 310. Advantageously the object subscriber 205 may select the mode in dependence on data requested in step 310.

Figure 4:
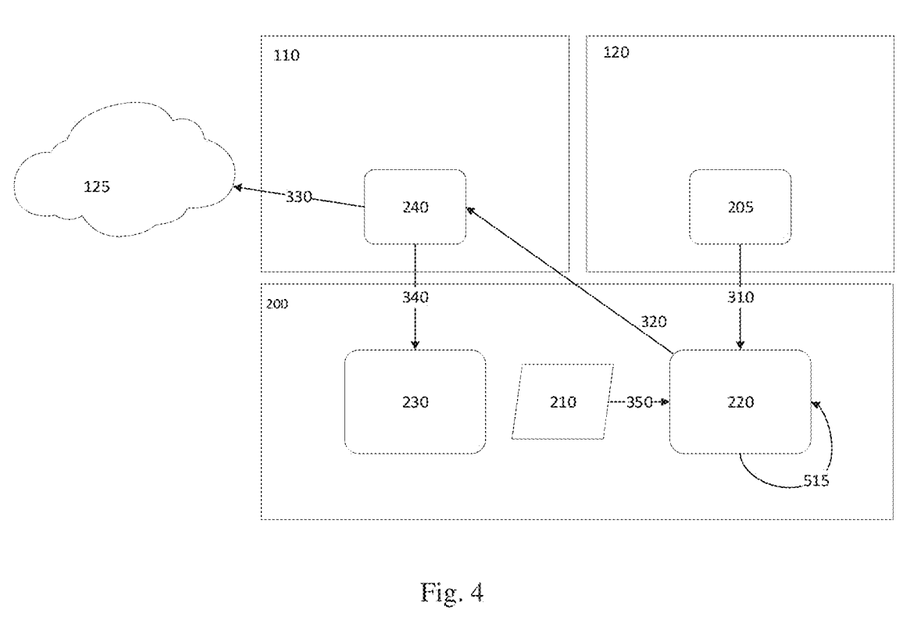
FIG. 4 shows the multi-tenant computing environment comprising the object bus operable in an asynchronous mode according to an embodiment of the invention.
Figure 5:
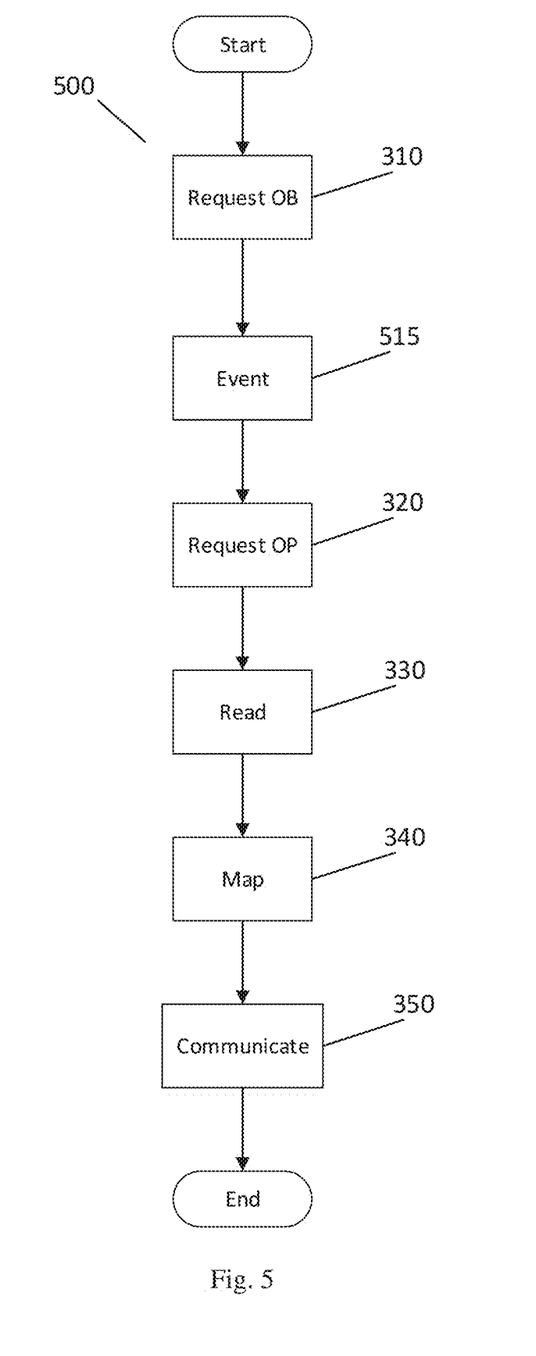
FIG. 5 shows a method according to another embodiment of the invention.

Referring to FIGS. 4 and 5, there is illustrated in FIG. 4 the MTCCE 100 comprising an object bus 200 which communicates object bus objects 210 between applications supported by the MTCCE 100 in the asynchronous mode. A method 500 of communicating data in a multi-tenant cloud computing environment is illustrated in FIG. 5 which may be performed in the MTCCE of FIG. 4. Steps of the method 500 and features of the MTCCE 100 having consistent numbering to those in FIGS. 2 and 3 have the same function and repeat description will be omitted for clarity.

In step 515 of the method 500, in response to receiving the request 310 from the object bus subscriber 205 associated with the second application 120, the object broker 220 generates or issues an event in step 515. Events are notified to subscribers for that event type in the MTCCE 100.

The event generated by the object broker 220 in step 515 may be a GetObject event to which the object broker 220 subscribes. The use of the event decouples transactions comprising the receiving of the request from the second application 120, as in step 310, which is performed in a first transaction from the obtaining of data and communication of the object bus object 210 which is performed in a second transaction as in steps 320-350. The MTCCE 100 may suspend operation of the object bus 200 between steps 310 and 320-35 respectively, which advantageously allows the operations of the object bus 200 to span a plurality of transactions of the MTCCE 100. With the request in step 310 the second application 120 may identify a class which implements a callback interface. The object bus 200 instantiates the class and invokes the instance when data is retrieved in the second, subsequent, transaction. Advantageously this allows the request and return of data to span the two transactions. The asynchronous mode may be selected in dependence on the request 310 requesting a substantial amount of data i.e. more data than may be expected to be transferred in a single transaction.

In step 515 the event issued by the object broker 220 is received by the object broker 220. The object broker 220 thus subscribes to the event type issued by the object broker 220. In response to receiving the event in step 515, the object broker 220 performs steps 320-350 as described above.

In embodiments of the invention the object bus 200 may for publish-subscribe data communication, where an object source such as the first application 110 in the illustrated examples publishes data which may be consumed by one or more subscribers. In some embodiments, the publish-subscribe process is achieved by means of an event being issued by the data source i.e. the first application 110 which publishes an indication of a data object having changed. The event indicative of the data object having changed is communicated to one or more object subscribers 205 by the object broker 220. As noted above, the one or more object subscribers 205 are entities which are each associated with a respective application, such as the second application 120, in the MTCCE 100. Each object subscriber 205 may register with object bus 200 to receive events of one or more predetermined types to thereby subscribe to the respective event type. The event type is used to notify subscribers of data associated with the data source, i.e. the first application 110, having changed. The event may provide information about one or both the type of data and the change. Based on the event the one or more subscribers may determine whether they are interested in obtaining the changed data.

Thus an event may be issued by, for example, the first application 110 to notify a plurality of subscribing applications in the MTCCE 100 of data within the first application 110 having changed. For example, where the data within the first application corresponds to an object within the first application, the event may be an object lifecycle event such as indicative of creation of a new instance of the object, modification of an existing instance of the object, or deletion of an existing instance of the object. These events are broadcast to all subscribers within the MTCCE 100. Each subscriber, such as the second application 120, may then determine whether to request data from the first application 110 in dependence on the change in state of the object at the first application.

Figure 6:
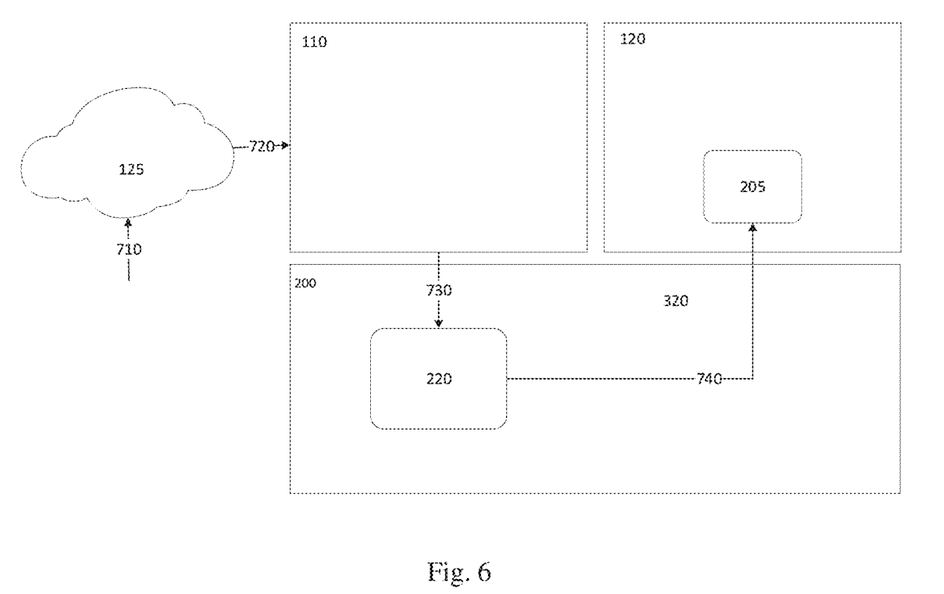
FIG. 6 shows the multi-tenant computing environment comprising the object bus operable to communicate events according to an embodiment of the invention.
Figure 7:
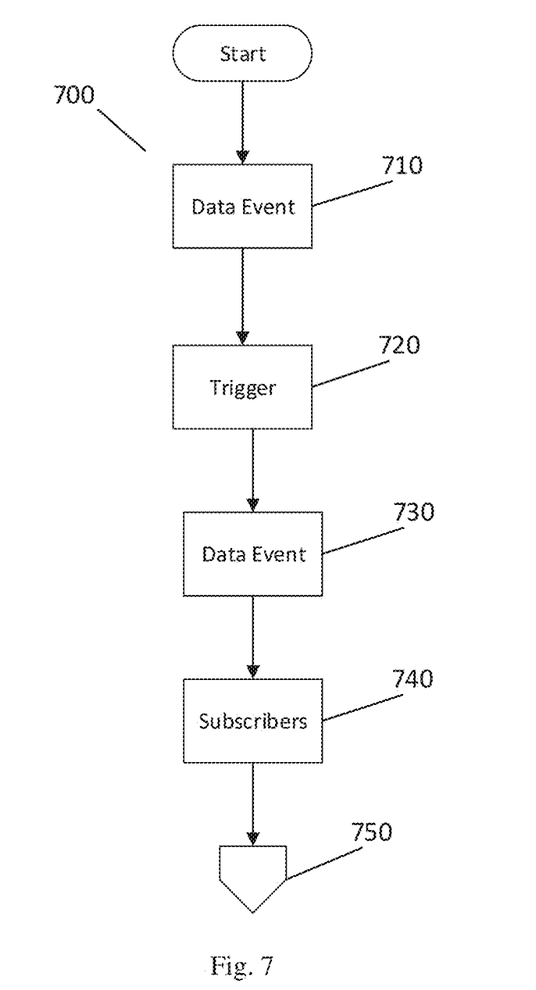
FIG. 7 shows a method according to a further embodiment of the invention.

Referring to FIG. 6 which illustrates the use of events in the MTCCE 110 with the object bus 200 to support the publish-subscribe process, an object subscriber 205 associated with the second application 120 is illustrated in FIG. 6. The object subscriber 205 registers with the object bus 200 to receive events associated with the data of the first application 110. FIG. 7 illustrates a method 700 of communicating data in a multi-tenant cloud computing environment which may be performed in the MTCCE 100 of FIG. 6.

In step 710 of the method 700 a data event occurs with respect to data owned by the data source i.e. the first application 110. The data event may be a CRUD event (create, read, update, delete) with respect to the data owned by the first application 110. The CRUD event may concern, for example, update of details of an employee whose details are stored in a database associated with the first application 110.

The event provides a trigger 720 to the object source i.e. the first application in step 720 which issues a data event to the object bus in step 730. The data event may be indicative of data owned by the first application having changed such as an ObjectChanged event. The event is received by the object broker 220.

In step 740 the event is communicated to object subscribers having subscribed for that type of event associated with the first application 110. In response to receiving the event, the second application 120 may obtain i.e. 'pull' the data referenced by the event using a method as described above with reference to FIG. 3 or FIG. 5 as indicated by step 750 shown in FIG. 7.

Figure 8:
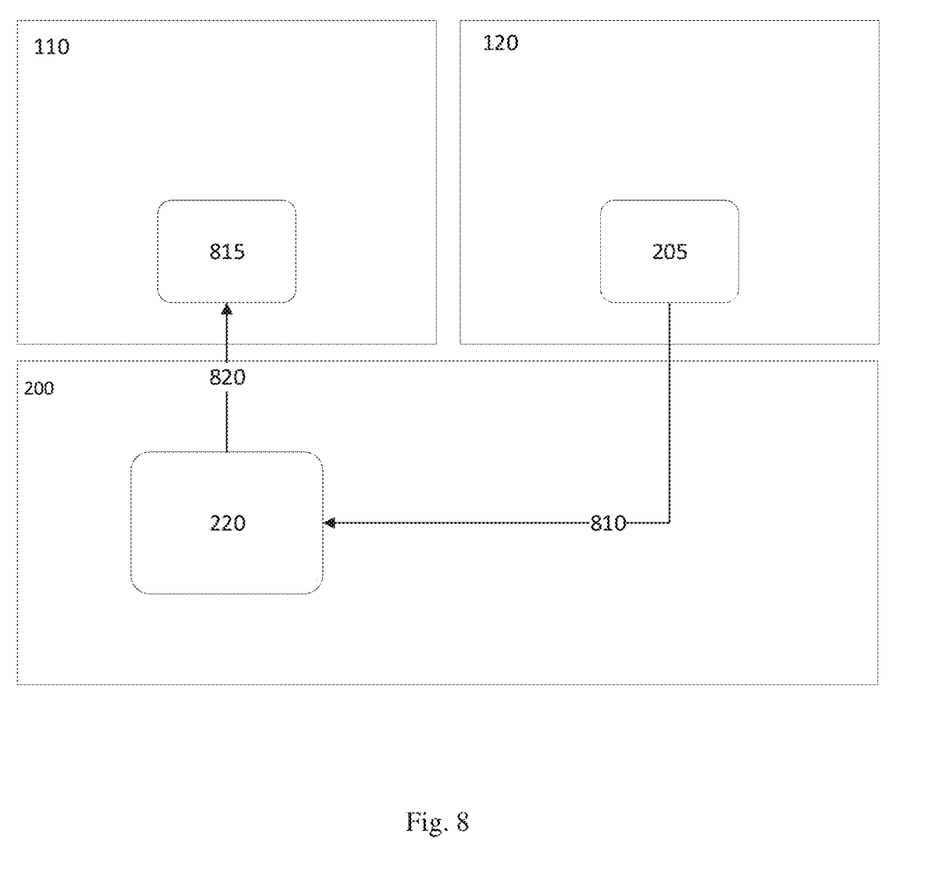
FIG. 8 illustrates notifications communicated by the object bus according to an embodiment of the invention.

FIG. 8 illustrates an embodiment of the MTCCE which supports communication of notifications. A notification allows an object subscriber 205 to communicate information to a source application i.e. the first application 110 in the example embodiments described above. The object subscriber 205 sends a notification to the object broker 220 in step 810. The object broker 220 creates a notification receiver 815 associated with the first application 110 which registers with the first application 110 as the object source. The notification is communicated from the object broker 220 to the notification receiver 815. In this way, notifications are supported between applications in the MTCCE 100. A notification maybe generated by the second application 120 in dependence on receiving an event from the first application 110. The notification may provide supplemental information about an object instance. The event may indicate, for example, that an object associated with an employee has changed data. The subscriber, second application 120, may be arranged to validate address data associated with the employee and utilise a notification to inform the first application of validity of the address data, as an example.

Therefore it will be understood that notifications allow communication between applications in the MTCCE 100 via the object bus.

Advantageously embodiments of the invention allow data communication between applications in a multi-tenant cloud computing environment.

An aspect of the present invention provides a computer system, comprising one or more processors and one or more computer-readable data storage mediums, program instructions, stored on at least one of the one or more storage mediums for execution by the one or more processors, to provide a multi-tenant cloud computing environment to support at least first and second applications executing on the one or more processors within the cloud computing environment, an object bus for communicating object bus objects between applications supported by the cloud computing environment, and an object broker arranged to request, from an object provider associated with the first application, data from the first application, and an object mapper associated with the first application arranged to translate an object comprising the requested data to the object bus object, wherein the object provider provides the object bus object comprising the request data to the object broker to communicate the object bus object to the second application.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer system, comprising:
one or more processors and one or more computer-readable data storage mediums;
program instructions, stored on at least one of the one or more data storage mediums for execution by the one or more processors, to provide:
a multi-tenant cloud computing environment to support at least first and second applications executing on the one or more processors within the cloud computing environment; and
an object bus for communicating a canonical object bus object between applications supported by the cloud computing environment;
wherein the second application comprises an object subscriber which is arranged to register with the object bus, and the first application is arranged to authorise the object subscriber to receive data owned by the first application;
wherein the object bus comprises:
an object broker arranged to receive a request from the object subscriber associated with the second application for data from the first application, wherein the object broker is arranged to, in dependence thereon, request from an object provider associated with the first application, the requested data from the first application; and
an object mapper associated with the first application arranged to translate an object received from the object provider comprising the requested data to the canonical object bus object;
wherein the object mapper provides the canonical object bus object comprising the requested data to the object broker to communicate the canonical object bus object to the object subscriber associated with the second application.

2. The computer system of claim 1, wherein the object broker is selectively operable in one of a synchronous or asynchronous mode.

3. The computer system of claim 2, wherein the object broker is selectively operable in one of the synchronous or the asynchronous mode for the object subscriber to request the data from the first application in the selected synchronous or asynchronous mode.

4. The computer system of claim 3, wherein, in the asynchronous mode, the object broker is arranged to:
generate an event in dependence on receiving the request for the data from the object subscriber, wherein said event is received by the object broker; and
request the data from the object provider in dependence on receiving the event.

5. The computer system of claim 3, wherein, in the asynchronous mode,
the object subscriber is arranged to provide an indication of a callback interface to the object broker with the request for the data from the first application;
the object broker is arranged to invoke the callback interface to communicate the canonical object bus object to the second application.

6. The computer system of claim 1, wherein the object subscriber is arranged to register with the object bus to receive events of one or more predetermined types associated with the first application.

7. The computer system of claim 1, wherein:
the object bus is operable to communicate an event to one or more subscriber applications, wherein the event is issued by the first application and is indicative of the data being updated at the first application; and
the object subscriber associated with the second application is arranged to determine whether to request the data from the object provider in dependence on receiving the event.

8. The computer system of claim 1, wherein the object mapper is arranged to receive mapping information from the first application and to translate the object comprising the requested data to the canonical object bus object according to the mapping information.

9. A system, comprising:
the computer system of any preceding claim;
a first client computer arranged to communicate with the computer system via a computer network, wherein the client computer is arranged to utilise the second application executing in the multi-tenant cloud computing environment and to receive data corresponding to the canonical object bus object from the second application.

10. The system of claim 9, comprising a second client computer arranged to communicate with the computer system via the computer network, wherein the client computer is arranged to utilise the first application.

11. A computer-implemented method of communicating data in a multi-tenant cloud computing environment, comprising:
supporting, in a multi-tenant cloud computing environment, at least first and second applications executing on one or more processors within the cloud computing environment;
receiving, at an object bus, a request from an object subscriber associated with the second application to register with the object bus to receive data owned by the first application, wherein the first application is arranged to authorise the object subscriber to receive the data;
receiving at an object broker of the object bus a request from the object subscriber associated with the second application for data from the first application;
requesting, by the object broker, the data from an object provider associated with the first application;
translating, by an object mapper of the object bus associated with the first application, an object comprising the requested data to a canonical object bus object; and
communicating, via the object bus, the canonical object bus object from the object provider to the object subscriber associated with the second application.

12. The method of claim 11, comprising selecting one of a synchronous or asynchronous mode of operation of the object broker.

13. The method of claim 11, comprising receiving, at the object broker, a request for the data from an object subscriber associated with the second application and, in dependence thereon, requesting the data from the first application from an object provider associated with the first application.

14. The method of claim 13, comprising selectively operating the object broker in one of the synchronous or the asynchronous mode for the object subscriber to request the data from the first application.

15. The method of claim 14, wherein the object broker in the asynchronous mode:
generates an event in dependence on receiving the request for the data from the object subscriber, wherein said event is received by the object broker; and
requesting the data from the object provider in dependence on receiving the event.

16. The method of claim 14, comprising:
providing, via the object subscriber, an indication of a callback interface to the object broker with the request for the data from the first application; and
invoking, via the object broker in the asynchronous mode, the callback interface to communicate the canonical object bus object to the second application.

17. The method of claim 13, comprising:
communicating, from the object bus, an event to one or more subscriber applications, wherein the event is indicative of the data being updated at the first application; and
requesting, via the object subscriber, the data from the first application in dependence on receiving the event.

18. The method of claim 11, comprising receiving, at the object broker, mapping information from the first application for translating the object comprising the requested data to the canonical object bus object according to the mapping information.

19. Computer software stored on a non-transitory computer readable storage medium which, when executed by a computer, is arranged to perform a method according to claim 11.

* * * * *